United States Patent [19]
Volk

[11] Patent Number: 5,749,778
[45] Date of Patent: May 12, 1998

[54] HINGED POULTRY HOCK RETAINER

[75] Inventor: Daniel J. Volk, Alpharetta, Ga.

[73] Assignee: Volk Enterprises, Inc., Turlock, Calif.

[21] Appl. No.: 772,459

[22] Filed: Dec. 23, 1996

[51] Int. Cl.$^6$ .................................................. A22C 21/00
[52] U.S. Cl. ........................................ 452/174; 452/176
[58] Field of Search ................................ 452/176, 174

[56] References Cited

U.S. PATENT DOCUMENTS

| 1,123,019 | 12/1914 | Selden . | |
| 3,348,595 | 10/1967 | Stevens, Jr. | 206/525 |
| 3,357,070 | 12/1967 | Sloan . | |
| 4,056,865 | 11/1977 | Cloyd | 456/176 |
| 4,653,146 | 3/1987 | Volk | 452/174 |
| 4,771,509 | 9/1988 | Volk | 452/176 |
| 4,818,121 | 4/1989 | Volk | 383/6 |
| 5,279,519 | 1/1994 | Volk | 452/174 |
| 5,292,277 | 3/1994 | Volk et al. | 452/176 |
| 5,380,241 | 1/1995 | Volk | 452/176 |
| 5,498,201 | 3/1996 | Volk | 452/174 |

FOREIGN PATENT DOCUMENTS

| 205672A | 12/1986 | European Pat. Off. . |
| 1353431 | 4/1963 | France . |
| 1218932 | 9/1961 | Germany . |

*Primary Examiner*—Willis Little
*Attorney, Agent, or Firm*—Julian Caplan; Flehr Hohbach Test Albritton & Herbert

[57] ABSTRACT

A retainer for poultry hocks is formed as a ring of a thin unitary plastic material, such as nylon. The ring has hinged flaps extending inward from opposite sides thereof. Poultry hocks inserted through the ring cause the flaps to bend outward and then partially retract backward so that the edges of the flaps engage behind the hock knuckles, holding the thighs close to the body of the fowl. Preferably, either the ring or the flaps are cut away to increase the length of the hinge area. In a modification, legs extending away from the ring define an opening into which the tail of the poultry may be inserted.

11 Claims, 2 Drawing Sheets

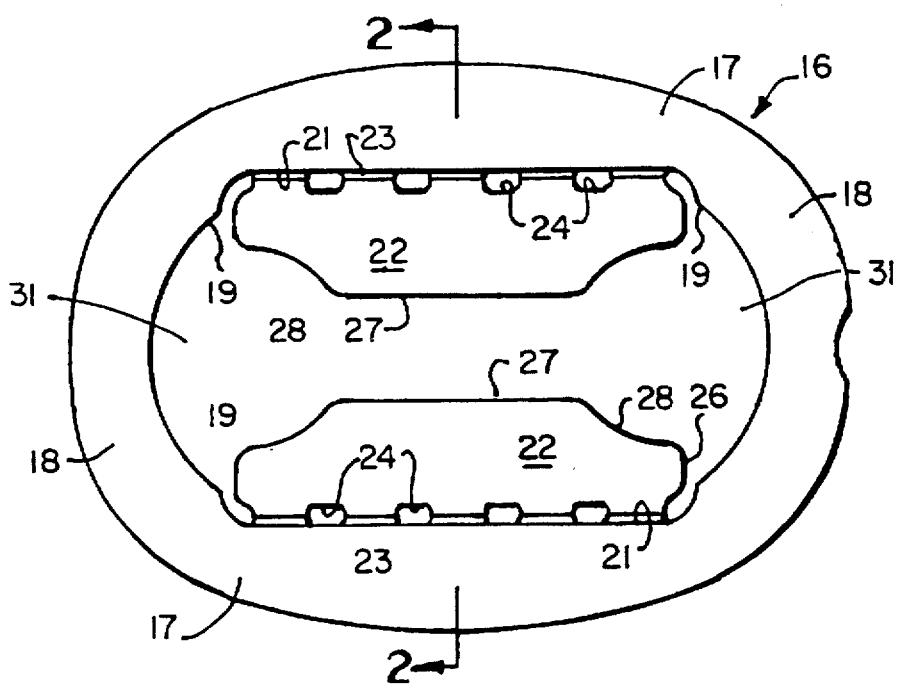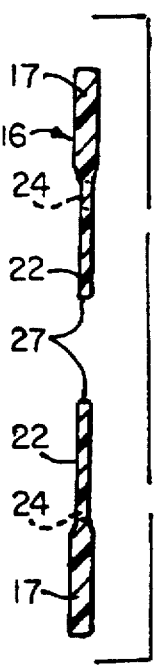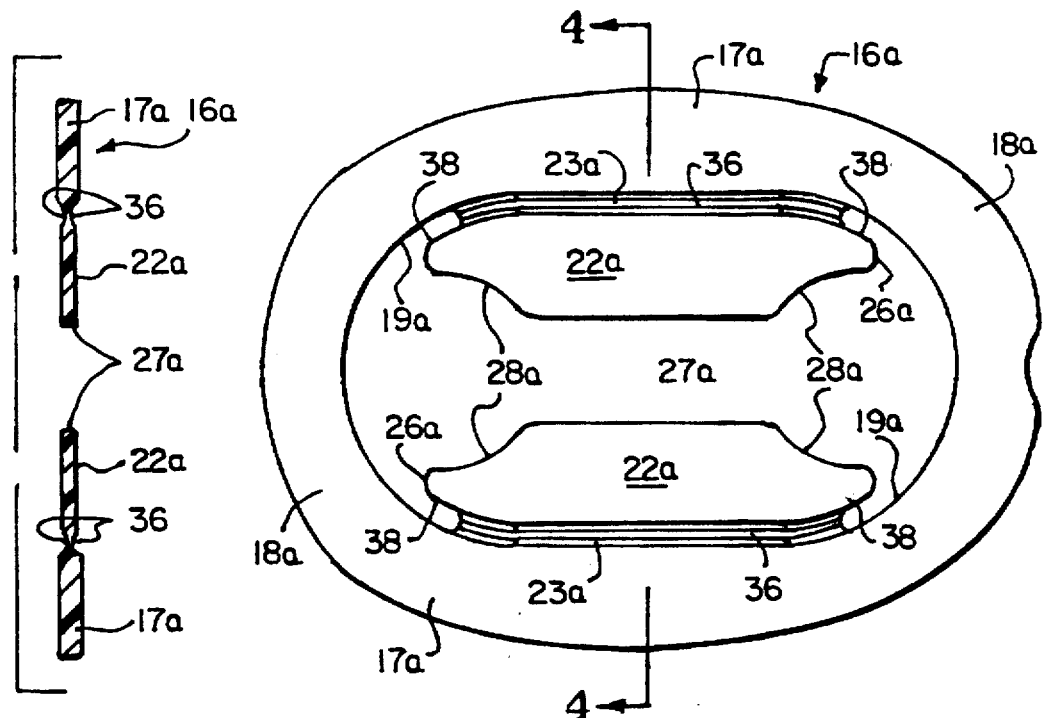
FIG. 1
FIG. 2
FIG. 4
FIG. 3

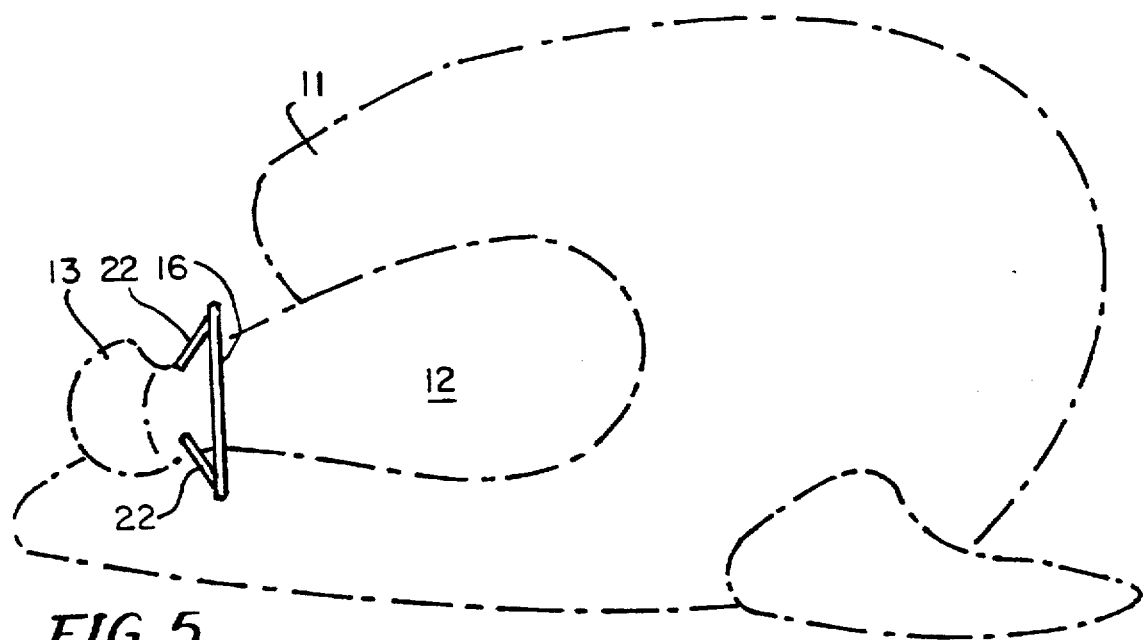
FIG. 5
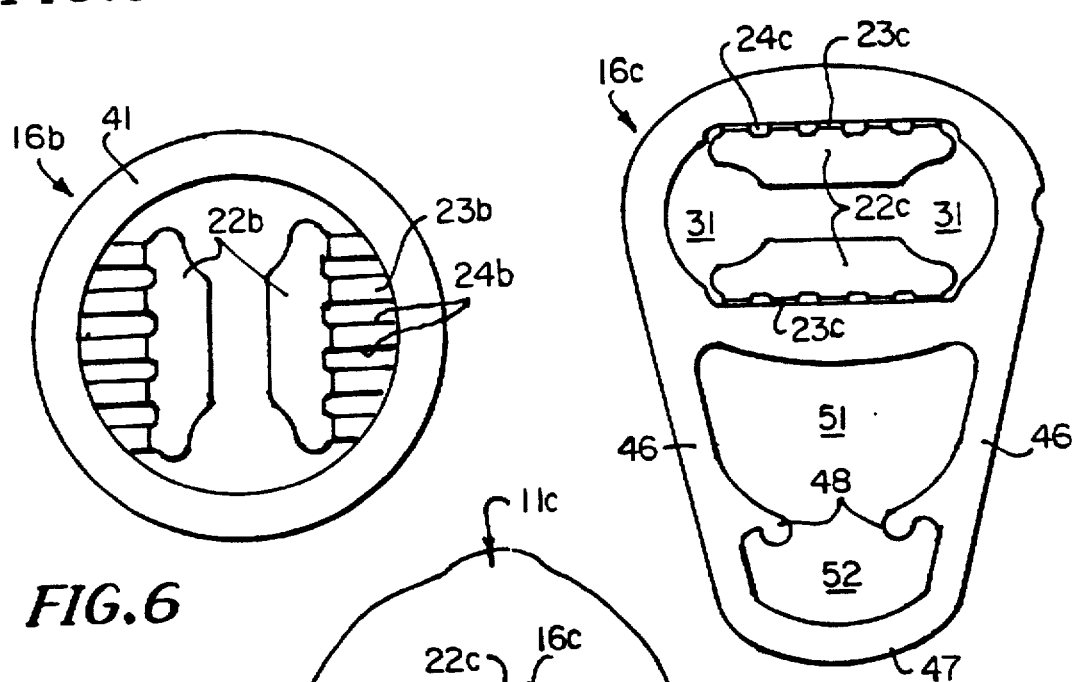
FIG. 6
FIG. 7
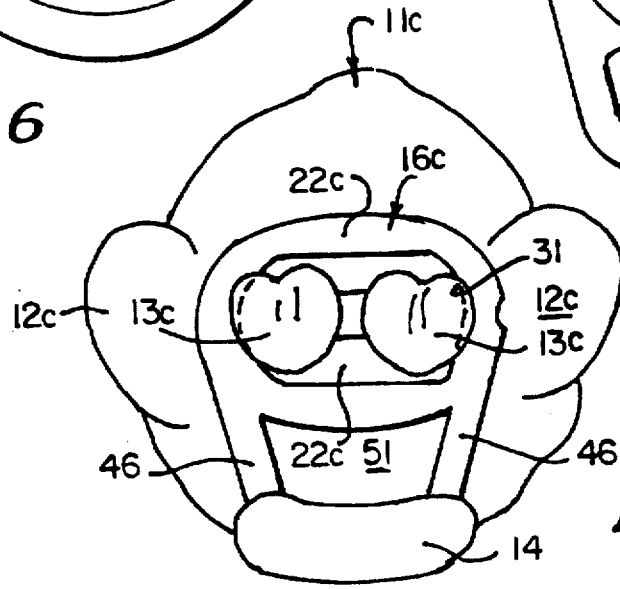
FIG. 8

HINGED POULTRY HOCK RETAINER

BACKGROUND OF THE INVENTION

1. Field of the Invention

This invention relates to a new and improved hinged poultry hock retainer. More particularly, the invention relates to a ring-like retainer slipped over the knuckles of poultry hocks to retain the thighs in proximity to the carcass during cooking. The device is particularly useful in holding the hocks in place during rotisserie roasting.

2. Prior Art

U.S. Pat. No. 5,498,201, issued Mar. 12, 1996 to applicant, discloses a retainer used for the same purpose. The present invention differs from that shown in the aforesaid patent by reason of the fact that the prongs disclosed therein are replaced by flaps which are hinged to the ring and which more effectively retain the hock in place, particularly where the poultry is small in size.

References cited in the aforesaid U.S. Pat. No. 5,498,201 include various forms of hock retainers, none of which is relevant to the present invention. The references cited also include ring-like closures for the gathered necks of bags, having flexible teeth which engage the gathered portion of the bag. The present invention is intended for a specific use; the structure hereinafter described is intended for such use and also differs in construction from prior art bag retainers.

SUMMARY OF THE INVENTION

A thin plastic ring has a flap hinged to the inner edge of the ring. The hocks of poultry are inserted through the ring causing the flap to flex in a first direction. The ring engages the hocks and holds them close against the carcass of the fowl. Once the knuckles of the hocks have passed the flaps, the flaps retract in a second direction opposite the first and engage behind the knuckles of the hocks, thereby restraining disengagement of the retainer.

The shape of the ring is subject to variations. In one form, the ring is oval and, in another, circular. The hinge areas between the flaps and the ring are shaped so that an elongated hinge is obtained.

In a modification of the invention, an extension of the ring provides means to secure the ring to the tail of the fowl. The tail may be spaced from the hocks so that a skewer may be inserted across the opening in the rear of the carcass.

BRIEF DESCRIPTION OF THE DRAWINGS

The accompanying drawings, which are incorporated in and form a part of this specification, illustrate embodiments of the invention and, together with the description serve to explain the principles of the invention.

FIG. 1 is a plan view of one form of retainer in accordance with the present invention.

FIG. 2 is a schematic sectional view taken substantially along the line 22 of FIG. 1.

FIG. 3 is a view similar to FIG. 1 of a modified retainer.

FIG. 4 is a schematic sectional view taken substantially along the line 44 of FIG. 3.

FIG. 5 is a schematic side elevational view of a dressed foul with the retainer applied.

FIG. 6 is a view similar to FIG. 1 of another modified retainer.

FIG. 7 is a view similar to FIG. 1 of a still further modification.

FIG. 8 is a schematic rear elevational view of a portion of a fowl with the retainer of FIG. 7 installed thereon.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

As shown in FIG. 5, a dressed poultry carcass 11 has a pair of hocks 12 which terminate in knuckles 13. Retainer 16 is slipped over both hocks 12, securing the same in close proximity to the carcass. This is particularly desirable in rotisserie cooking.

Retainer 16, shown in FIGS. 1 and 2, is formed from a thin sheet of plastic material such as nylon and is generally in the shape of an oval ring. Retainer 16 has opposed elongated sides 17 and arcuate ends 18 with rounded inside corners 19 at the junctures therebetween. The inner edges of sides 17 are cut away, as shown by reference numeral 21, to permit elongation of hinged flaps 22 which are connected to sides 17 by hinge 23. Optionally, holes 24 may be formed in hinge area 23 to increase flexibility. Further to promote flexibility, flaps 22 may be thinner than ring 16, but this feature is also optional.

Flaps 22 have short inward extending side edges 26 and preferably straight inner edges 27, the opposite inner edges 27 being spaced apart as best shown in FIG. 1. The intersections 28 between the side edges 26 and inner edge 27 are cut away to accommodate the thickness of hocks 12.

In use, retainer 16 is slipped up over the knuckles 13 and hocks 12, the hocks 12 first passing through openings 31 lateral of flaps 22 and fitting against the inner edges of the arcuate ends 18 and causing the flaps 22 to flex in a first direction as shown in FIG. 5. After the knuckles 23 have passed through the retainer 16, the flaps 22 retract in a second direction partially toward their initial flat position, lodging behind the knuckles 13 and preventing the retainer from slipping off the hocks. After the fowl is cooked, the retainer maybe removed in various fashions such as by cutting or by bending the flaps 22 outwardly so that knuckles 13 clear.

FIGS. 3 and 4 illustrate a modification wherein there preferably is a reduced thickness 36 at hinge joint $23_a$. It will be seen that the inner edges of flaps $22_a$ are formed with curved edges 38 to permit flaps $22_a$ to extend longer along side $17_a$ than would be the case if the inner edges of flaps $22_a$ were straight.

FIG. 6 shows a retainer $16_b$ which is in the form of a round ring 41. Hinge $23_b$ is elongated so that the ends thereof may flex without interference which would otherwise occur if the ends contacted the ring. Elongated holes $24_b$ promote flexibility.

FIG. 7 illustrates a modification, the use of which is illustrated in FIG. 8. Ring $16_c$ may be similar to that shown in FIG. 1 or other modifications. Ring $16_c$ is formed with downward converging legs 46 joined at their lower ends by connector 97. Inward-downward hooks 48 are formed on each of legs 46, spaced upward from connector 47. The shape thus described provides a wider opening 51 above hooks 48 and a narrower opening 52 between hooks 48 and connector 47.

Poultry, as commonly merchandised, has a tail 14 which is generally bulbous and is thinner where it joins the carcass. In use, the hocks $12_c$ are inserted through openings 31 and tail 14 through opening 51. Flaps $22_c$ flex to permit passage of knuckles $13_c$ and then retract to engage behind the knuckles. The tail 14 is then pushed downward into opening 52. Hooks 48 prevent the tail frame moving back into opening 51. The thighs $12_c$ are thus held more tightly against carcass $11_c$.

In other respects, the modification of FIGS. 3-4, 6 and 8 resemble those of FIGS. 1-2; and the same reference numerals followed by the subscript a, b and c, respectively, are used to indicate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A retainer for fowl having hocks having distal knuckles comprising a thin, unitary member having a body formed in a ring with an opening, a flap, a hinge connecting said flap to said ring, said opening being shaped for passage through the opening of a pair of hocks to hold the hocks against a fowl carcass, said flap being shaped to flex distally as said hocks are inserted through said opening and then to retract at least partially toward initial position to engage proximally against the knuckles.

2. A retainer according to claim 1 in which said flap has a substantially straight inner edge at its center and is formed with a cutaway portion at either end of said edge.

3. A retainer according to claim 1 in which said hinge is formed with a plurality of spaced holes to promote flexibility of said hinge.

4. A retainer according to claim 1 in which said flap is thinner than said ring.

5. A retainer according to claim 4 in which said retainer is formed of a thickness less than that of said flap where said flap and said ring join.

6. A retainer according to claim 1 in which said ring is flat and oval.

7. A retainer according to claim 1 in which said ring is flat and circular.

8. A retainer according to claim 1 which further comprises means spaced from said ring forming a first opening below said ring and a second opening smaller than said first opening connecting with said first opening whereby the tail of the fowl may be inserted into said first opening and then moved into said second opening.

9. A retainer according to claim 8 which further comprises hooks located between said first and second openings positioned to engage the tail to prevent return of the tail to said first opening.

10. A retainer according to claim 1 which further comprises legs extending from said ring and hooks on said legs extending toward each other whereby the tail of a fowl may be inserted between said legs and retained by said hooks.

11. A retainer according to claim 1 which further comprises a second flap hinged to said ring opposite said first-mentioned flap said first mentioned, and said second flap each having an inner edge, said inner edges being spaced apart.

* * * * *